United States Patent
Chen et al.

(10) Patent No.: US 10,552,233 B2
(45) Date of Patent: Feb. 4, 2020

(54) APPLICATION CONVERGENCE METHOD AND APPARATUS

(71) Applicant: HUAWEI TECHNOLOGIES CO., LTD., Shenzhen, Guangdong (CN)

(72) Inventors: Shanxi Chen, Shenzhen (CN); Mingjie Dong, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/047,629

(22) Filed: Jul. 27, 2018

(65) Prior Publication Data

US 2018/0373575 A1  Dec. 27, 2018

Related U.S. Application Data

(63) Continuation of application No. PCT/CN2017/071121, filed on Jan. 13, 2017.

(30) Foreign Application Priority Data

Jan. 29, 2016 (CN) .......................... 2016 1 0070659

(51) Int. Cl.
*G06F 3/00* (2006.01)
*G06F 9/54* (2006.01)
(Continued)

(52) U.S. Cl.
CPC ............... *G06F 9/541* (2013.01); *G06F 8/61* (2013.01); *G06F 8/72* (2013.01); *G06F 9/451* (2018.02); *G06F 9/54* (2013.01); *G06F 16/284* (2019.01)

(58) Field of Classification Search
CPC ......................................................... G06F 9/54
(Continued)

(56) References Cited

U.S. PATENT DOCUMENTS 9,038,177 B1   5/2015 Tierney
2007/0186188 A1*  8/2007 Harris ................ G06F 9/451
                                                  715/835

(Continued)

FOREIGN PATENT DOCUMENTS

CN   102360377 A    2/2012
CN   103440303 A   12/2013
(Continued)

OTHER PUBLICATIONS

Ralph D. Hill, The Abstraction-Link-View Paradigm: Using Constraints to Connect User Interfaces to Applications, (Year: 1992).*

*Primary Examiner* — Lechi Truong
(74) *Attorney, Agent, or Firm* — Womble Bond Dickinson (US) LLP

(57) ABSTRACT

Embodiments of the present invention disclose an application convergence method and apparatus. Multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications.

20 Claims, 8 Drawing Sheets

(51) Int. Cl.
 *G06F 9/451* (2018.01)
 *G06F 16/28* (2019.01)
 *G06F 8/61* (2018.01)
 *G06F 8/72* (2018.01)

(58) Field of Classification Search
 USPC .......................................................... 719/310
 See application file for complete search history.

(56) References Cited

U.S. PATENT DOCUMENTS

| | | | |
|---|---|---|---|
| 2011/0161985 A1* | 6/2011 | Witte | ...................... G06F 9/541 |
| | | | 719/313 |
| 2013/0311997 A1 | 11/2013 | Gruber et al. | |
| 2014/0040748 A1 | 2/2014 | Lemay et al. | |

FOREIGN PATENT DOCUMENTS

| | | |
|---|---|---|
| CN | 104008135 A | 8/2014 |
| CN | 104657371 A | 5/2015 |
| CN | 105786484 A | 7/2016 |
| EP | 2779582 B1 | 9/2014 |
| WO | 2006/026686 A1 | 3/2006 |

\* cited by examiner

APPLICATION CONVERGENCE METHOD AND APPARATUS

CROSS-REFERENCE TO RELATED APPLICATIONS

This application is a continuation of International Application No. PCT/CN2017/071121, filed on Jan. 13, 2017, which claims priority to Chinese Patent Application No. 201610070659.3, filed on Jan. 29, 2016. The disclosures of the aforementioned applications are hereby incorporated by reference in their entireties.

TECHNICAL FIELD

The present invention relates to the field of intelligent terminal technologies, and in particular, to an application convergence method and apparatus.

BACKGROUND

Diverse applications (apps) on an intelligent terminal greatly change entertainment, life, or a working style of a user. However, installation of a large quantity of apps brings great inconvenience to the user. These apps are complex, and many apps have a same function. This brings great inconvenience to the user during use of the apps.

For convenient use of an application, an existing manner is to use the Siri voice digital assistant of Apple Inc. Based on the Siri voice tool software, the Siri of Apple Inc. calls, by parsing voice semantics, other apps to complete an action that needs to be executed, and displays an execution result to a user.

Such a voice digital assistant may implement a call of apps, but such a voice digital assistant is built in an operating system. Consequently, not any app may be used as a digital assistant, and specific apps to be called are not determined by the user.

SUMMARY

Embodiments of the present invention provide an application convergence method and apparatus, so as to implement convergence of multiple applications according to an application convergence operation request.

According to a first aspect, an application convergence method is provided, including: registering multiple convergence parameters of each application by using multiple convergence parameter interfaces, where the multiple convergence parameters include a format of data of each application and a logical relationship between the data of each application; and when a convergence operation request is received, separately obtaining multiple convergence parameters of multiple applications by using the multiple convergence parameter interfaces, and separately converging the obtained multiple convergence parameters of the multiple applications, so as to obtain a logical relationship between data of the converged application and obtain a format of the data of the converged application.

In a device provided in an embodiment of the present invention, an operating system provides multiple convergence parameter interfaces for an application, and the application registers multiple convergence parameters by using the convergence parameter interfaces during installation. Some of these convergence parameters may be used to indicate whether applications can be converged, and other convergence parameters may be used to indicate required information, such as a format of data of a converged application or an interface display format. Certainly, there may be one of the foregoing types of convergence parameters. In this way, the operating system may obtain convergence parameters of multiple applications, and perform, according to convergence parameters of applications that need to be converged, application convergence when a convergence requirement is received.

In some embodiments of the present invention, a converged application may be an independent application with a unique application interface; for example, an application program icon may be a newly generated icon different from icons of multiple to-be-converged applications, and an application displayed after the icon is opened may be a new interface. In other embodiments of the present invention, a converged application may be one of multiple applications that need to be converged, and data information of another application is displayed by using the application and an interface of the application; for example, after a map application and a social application are converged, geographical location information of a friend in the social application is converged on a map of the map application. In still other embodiments of the present invention, when a converged application is not used, data obtained after the application is processed is not displayed, and the data obtained after the application is processed is displayed only when a user or another application uses a function of the converged application.

In this implementation, application installation may not be performed in the operating system, and an application icon is not displayed on a user interface, but application convergence may be completed, provided that the multiple convergence parameters are registered by using the convergence parameter interfaces; certainly, application installation may be performed in the operating system, an application icon is displayed on a user interface, and during the application installation, the multiple convergence parameters are registered by using the convergence parameter interfaces, and the convergence operation request of the user for the applications is received, so as to perform an application convergence operation.

In one embodiment, the method further includes determining a display user interface of the converged application.

In this implementation, if the application installation is performed in the operating system, and the application icon is displayed on the user interface, the converged application also has a corresponding display user interface after the application convergence is performed.

In addition, there is no sequence between "determining the display user interface of the converged application" and "separately obtaining the multiple convergence parameters of the multiple applications by using the multiple convergence parameter interfaces, and separately converging the obtained multiple convergence parameters of the multiple applications, so as to obtain the logical relationship between the data of the converged application and obtain the format of the data of the converged application".

In one embodiment, the multiple convergence parameters further include convergeability limit information of the data of each application; and the method further includes: obtaining the data of the converged application according to the convergeability limit information of the data of each application; and outputting, on the display user interface of the converged application, the data of the converged application according to the logical relationship between the data of the converged application and according to the format of the data of the converged application.

In this implementation, not only the application convergence is performed, but also the data of the converged application is output on the display user interface of the converged application according to the logical relationship between the data of the converged application and according to the format of the data of the converged application, so as to implement interworking between data of the multiple applications.

With reference to the second possible implementation of the first aspect, in a third possible implementation of the first aspect, for the format of the data of each application, multiple two-dimensional tables are used to describe the data of each application; the logical relationship between the data of each application includes a relationship between the multiple two-dimensional tables, and a base data table and a top-level data table that are in the multiple two-dimensional tables; and the convergeability limit information of the data of each application includes information about data that supports convergence and/or does not support convergence and that is in the data of each application.

In one embodiment, the method further includes:

separately storing the multiple convergence parameters of each application into a storage space of the operating system.

In one embodiment, the receiving a convergence operation request of a user for the multiple applications includes: receiving an operation request of the user for dragging the multiple applications to a target application, where the converged application is the target application, and the target application is one of the multiple applications; or receiving an operation request of the user for creating a new application by dragging the multiple applications to an empty position, where the converged application is the newly created application.

In this implementation, the application convergence is implemented by performing a drag operation on an operation, and therefore an operation is simple and convenient.

In one embodiment, the receiving a convergence operation request of a user for the multiple applications includes receiving a request of the user for selecting the multiple applications and the converged application in an application list, where the converged application is one of the multiple applications or an application other than the multiple applications in the application list.

In this implementation, the convergence is implemented by selecting an application in the application list, and therefore an operation is simple and convenient.

In one embodiment, before the separately obtaining multiple convergence parameters of the multiple applications by using the multiple convergence parameter registration interfaces, the method further includes: checking whether the multiple convergence parameter interfaces meet a convergence specification; if a check result does not meet the convergence specification, requesting, from an application center, an application program installation package including multiple convergence parameter interfaces that meet the convergence specification; if the application program installation package exists in the application center, downloading the application program installation package, or if the application program installation package does not exist in the application center, the application center compiles application program source code by adapting the multiple convergence parameter interfaces, and after the application program installation package is generated, the application program installation package is then downloaded; and installing the downloaded application program installation package.

In this implementation, the convergence parameter interfaces are adapted to meet the convergence specification, so that the convergence parameters in the convergence parameter interfaces can be called to perform the application convergence.

In one embodiment, the method further includes separately registering the logical relationship between the data of the converged application, the format of the data of the converged application, and/or convergeability limit information of the data of the converged application by using the multiple convergence parameter interfaces.

According to a second aspect, an application convergence apparatus is provided, and the application convergence apparatus has a function of implementing a behavior of the application convergence apparatus in the foregoing method. The function may be implemented by hardware, or may be implemented by hardware by executing corresponding software. The hardware or the software includes one or more modules corresponding to the foregoing function.

In a possible implementation, an application convergence apparatus is provided, including: a registration unit, configured to register multiple convergence parameters of each application by using multiple convergence parameter interfaces, where the multiple convergence parameters include a format of data of each application and a logical relationship between the data of each application; and a convergence unit, configured to: when a convergence operation request is received, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

In another possible implementation, an application convergence apparatus is provided, including: an input apparatus, the input apparatus, a storage device, and a processor. By executing a program or an instruction in the storage device, the processor is configured to: register multiple convergence parameters of each application by using multiple convergence parameter interfaces, where the multiple convergence parameters include a format of data of each application and a logical relationship between the data of each application; and when a convergence operation request is received, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

Implementation of the application convergence method and apparatus provided in the embodiments of the present invention brings about the following beneficial effects:

Multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications.

BRIEF DESCRIPTION OF DRAWINGS

To describe the technical solutions in the embodiments of the present invention. Apparently, the accompanying drawings in the following descriptions show merely some embodiments of the present invention, and a person of ordinary skill in the art may still derive other drawings from these accompanying drawings without creative efforts.

DESCRIPTION OF EMBODIMENTS

Figure 1:
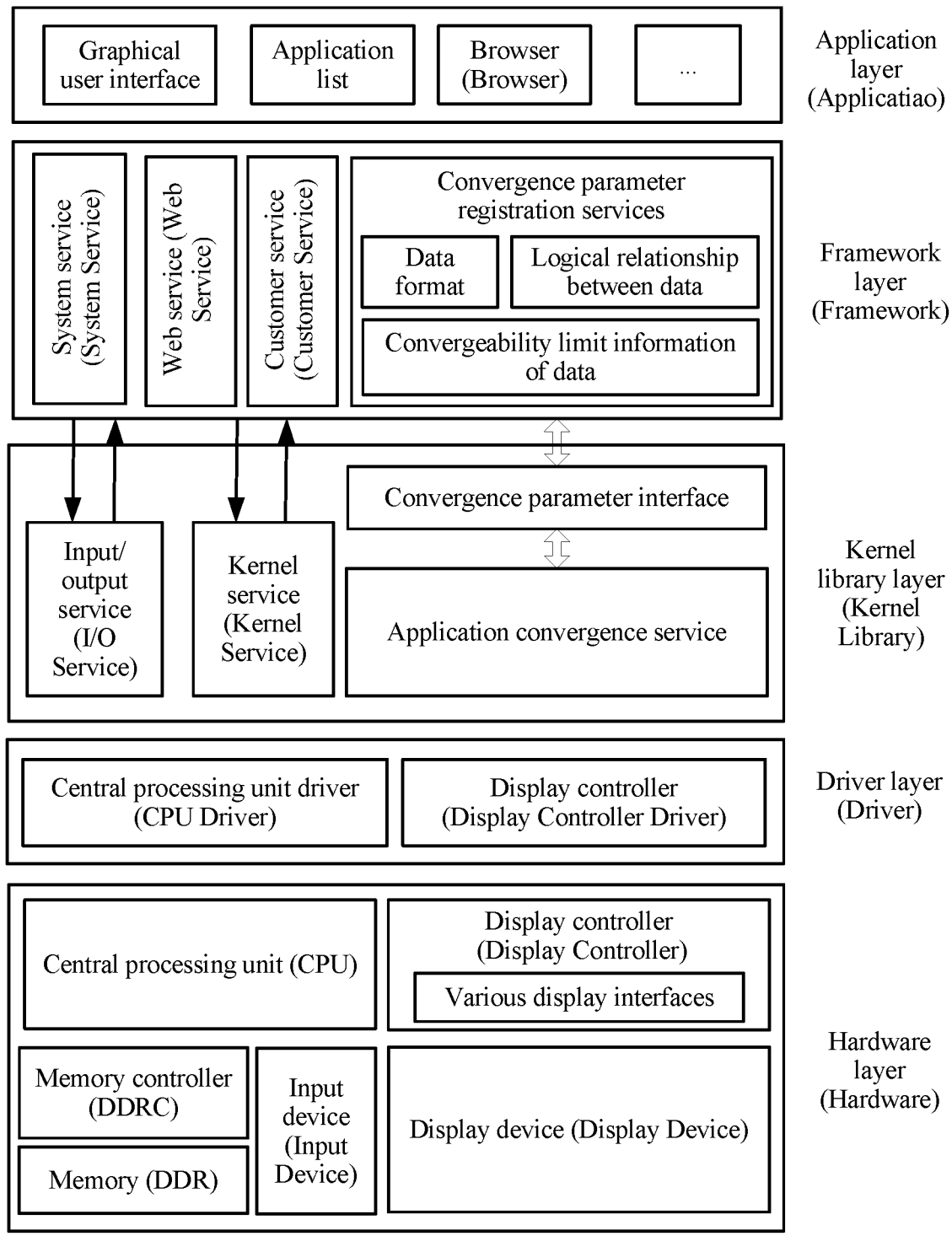
FIG. 1 is a schematic structural diagram of a terminal device.

FIG. 1 is a schematic structural diagram of a terminal device.

FIG. 1 is used as an example to describe a logical structure of a computing node that is applied to an application convergence method according to an embodiment of the present invention. The computing node may be a terminal device, and the terminal device may be specifically a smartphone. As shown in FIG. 1, a hardware layer of the terminal device includes a CPU, an input device, and the like. Certainly, the hardware layer of the terminal device may further include a storage device, an output device, a memory, a memory controller, a network interface, and the like. The input device may include a keyboard, a mouse, a touchscreen, and the like, and the output device may include a display device, such as an LCD, a CRT, holographic imaging (Holographic), a projector (Projector), and the like. An operating system (such as Android) and some application programs may run above the hardware layer. A kernel library is a core part of the operating system, and includes an input/output service, a kernel service, a convergence parameter interface, an application convergence service, and the like. In addition, the terminal includes a driver layer, a framework layer, and an application layer. The driver layer may include a CPU driver, a display controller driver, and the like. The framework layer may include a convergence parameter registration service and the like. The application layer may include a graphical user interface (Graphical User Interface, GUI for short), an application list, a browser (Browser), and the like. It should be understood that reference may be made to FIG. 1 for a logical structure of an entity for executing a method in an embodiment of the present invention.

Figure 2:
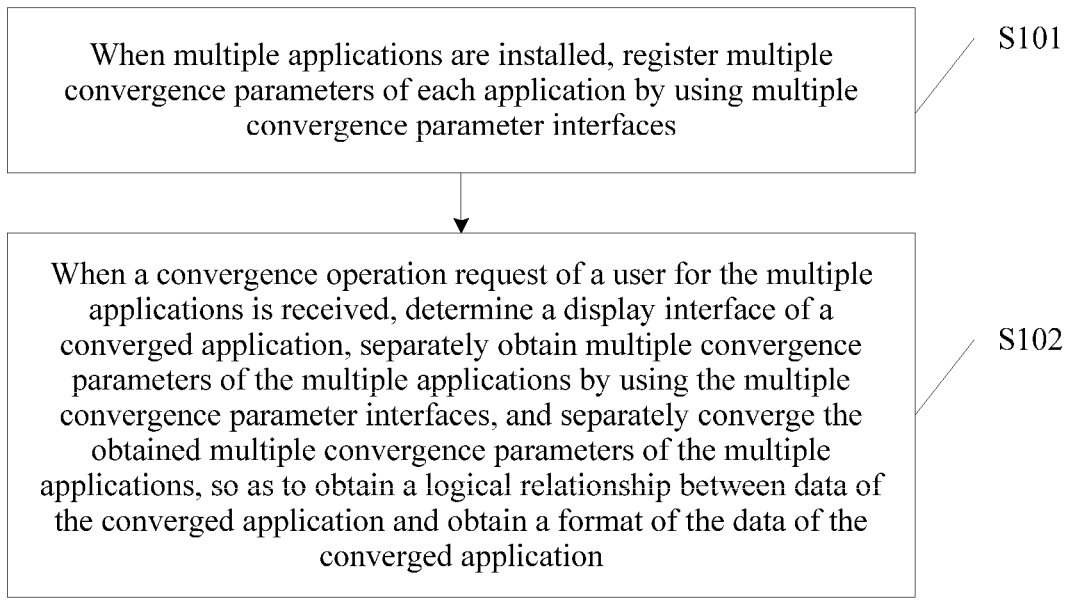
FIG. 2 is a schematic flowchart of an application convergence method according to an embodiment of the present invention.

FIG. 2 is a schematic flowchart of an application convergence method according to an embodiment of the present invention. The method includes the following operations:

S101. When multiple applications are installed, register multiple convergence parameters of each application by using multiple convergence parameter interfaces.

In this embodiment, an operating system enhances and refines an installation process of an application program, and provides the multiple convergence parameter interfaces, which are called by the application program during installation, so as to receive a request for registering the multiple convergence parameters of each application.

The multiple convergence parameters herein include a format of data of each application and a logical relationship between the data of each application. The application may register the format of the data of each application by using a data format registration interface, and may register the logical relationship between the data of each application by using a data logical relationship registration interface. Certainly, the application may also register the foregoing multiple convergence parameters by using a same interface. For the format of the data of each application, multiple two-dimensional tables are used to describe the data of each application; and the logical relationship between the data of each application includes a relationship between the multiple two-dimensional tables, and a base data table and a top-level data table that are in the multiple two-dimensional tables.

The convergence parameters may further include a data generation rule and a data read rule. The data generation rule indicates that an execution body or a program segment of the data is generated by using the data in a registered format in a data generation process. The data read rule indicates that data content stored in a form of a two-dimensional data table is read in the registered format in a data extraction/read process.

S102. When a convergence operation request of a user for the multiple applications is received, determine a display user interface of a converged application, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

The user may select to converge multiple applications installed on a terminal, and receive the convergence operation request of the user for the selected applications. During application convergence, the multiple convergence parameters of the multiple to-be-converged applications may be obtained by using the multiple convergence parameter interfaces. Specifically, for example, formats of data of the multiple applications are obtained by using the data format registration interface, and a logical relationship between the data of the multiple applications is obtained by using the data logical relationship registration interface.

After the multiple convergence parameters of to-be-converged applications requested in the convergence operation request are obtained, the obtained multiple convergence parameters of the multiple applications are separately converged, so as to obtain the logical relationship between the data of the converged application and obtain the format of the data of the converged application. Specifically, the formats of the data of the multiple applications are obtained by using the data format registration interface, and convergeability of the formats of the data of the multiple applications is checked, so as to obtain a converged data format as the format of the data of the converged application; and the logical relationship between the data of the multiple applications is obtained by using the data logical relationship registration interface, so as to determine the logical relationship between the data of the converged application.

It should be noted that application installation may not be performed in the operating system, and an application icon is not displayed on a user interface, but application convergence may be completed, provided that the multiple convergence parameters are registered by using the convergence parameter interfaces; certainly, application installation may be performed in the operating system, an application icon is displayed on a user interface, and during the application installation, the multiple convergence parameters are registered by using the convergence parameter interfaces, and the convergence operation request of the user for the applications is received, so as to perform an application convergence operation.

According to the application convergence method provided in this embodiment of the present invention, multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications.

Figure 3A:
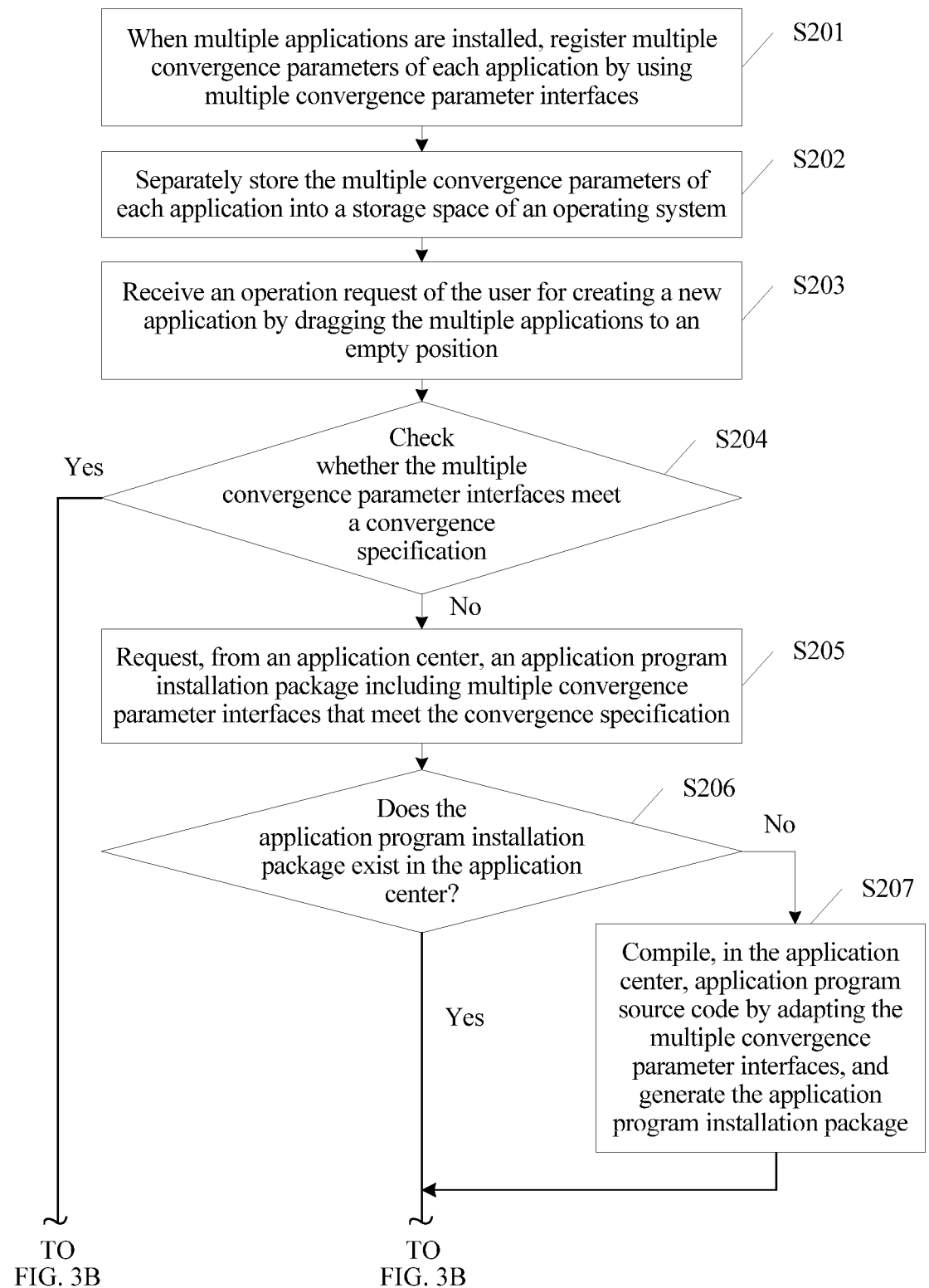
FIG. 3A-FIG. 3B are a schematic flowchart of another application convergence method according to an embodiment of the present invention.
Figure 3B:
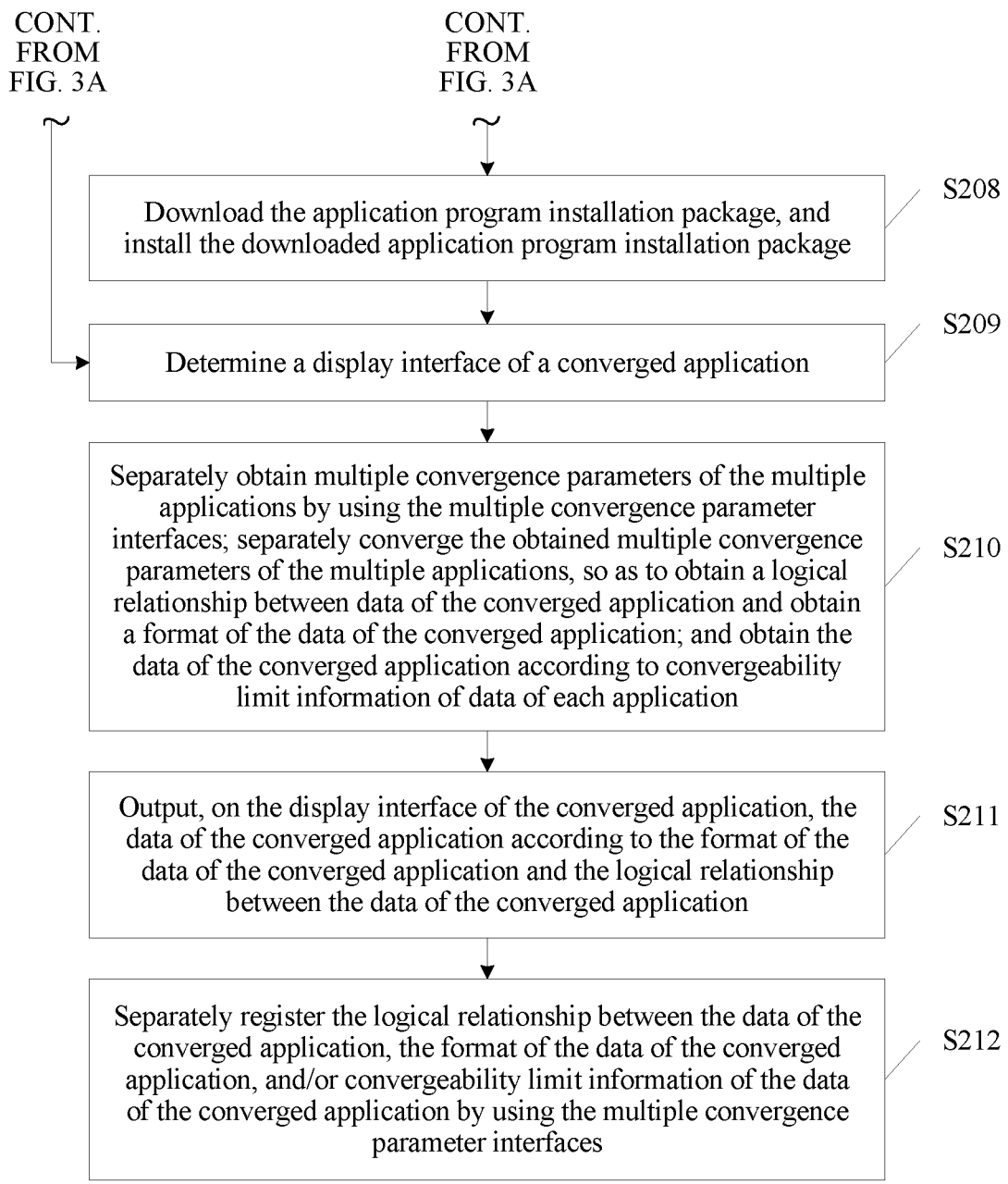

FIG. 3A-FIG. 3B are a schematic flowchart of another application convergence method according to an embodiment of the present invention. The method includes the following operations:

S201. When multiple applications are installed, register multiple convergence parameters of each application by using multiple convergence parameter interfaces.

In this embodiment, an operating system enhances and refines an installation process of an application program, and provides the multiple convergence parameter interfaces, which are called by the application program during installation, so as to receive a request for registering the multiple convergence parameters of each application.

The multiple convergence parameters herein include a format of data of each application, a logical relationship between the data of each application, and convergeability limit information of the data of each application. The application may register the format of the data of each application by using a data format registration interface, may register the logical relationship between the data of each application by using a data logical relationship registration interface, and may register the convergeability limit information of the data of each application by using a convergeability limit registration interface. Certainly, the application may also register the foregoing multiple convergence parameters by using a same interface. For the format of the data of each application, multiple two-dimensional tables are used to describe the data of each application; the logical relationship between the data of each application includes a relationship between the multiple two-dimensional tables, and a base data table and a top-level data table that are in the multiple two-dimensional tables; and the convergeability limit information of the data of each application includes information about data that supports convergence and/or does not support convergence and that is in the data of each application.

The convergence parameters may further include a data generation rule and a data read rule. The data generation rule indicates that an execution body or a program segment of the data is generated by using the data in a registered format in a data generation process. The data read rule indicates that data content stored in a form of a two-dimensional data table is read in the registered format in a data extraction/read process.

S202. Separately store the multiple convergence parameters of each application into a storage space of an operating system.

The multiple convergence parameters received by using all the convergence parameter interfaces are separately stored into multiple storage spaces of the operating system, so that the operating system calls the multiple convergence parameters during application convergence.

S203. Receive an operation request of the user for creating a new application by dragging the multiple applications to an empty position.

The converged application is the newly created application. The user may select to converge multiple applications installed on a terminal, and an apparatus receives a convergence operation request of the user for the selected applications. A drag may be directly performed on an application icon to trigger convergence. The drag includes dragging multiple applications to the empty position. A new application is created in the empty position, and the converged application is the newly created application.

In an alternative implementation, S203 may be: receiving an operation request of the user for dragging the multiple applications to a target application, where the converged application is the target application, and the target application is one of the multiple applications.

The foregoing drag manner is provided based on a terminal desktop, for example, a graphical user interface, so that the user can directly drag an application icon on the desktop. The application convergence is implemented by performing a drag operation on an operation, and therefore an operation is simple and convenient.

In another alternative implementation, S203 may be: receiving a request of the user for selecting the multiple applications and the converged application in an application list, where the converged application is one of the multiple applications or an application other than the multiple applications in the application list. That is, the applications are selected in the application list for convergence. Only identifiers of the multiple applications are listed in the application list for selection. The user may select the converged application as the application of the multiple applications or the application other than the multiple to-be-converged applications in the application list.

The convergence is implemented by selecting an application in the application list, and therefore an operation is simple and convenient.

S204. Check whether the multiple convergence parameter interfaces meet a convergence specification, and if the multiple convergence parameter interfaces meet the convergence specification, perform S209; or if the multiple convergence parameter interfaces do not meet the convergence specification, perform S205.

S205. Request, from an application center, an application program installation package including multiple convergence parameter interfaces that meet the convergence specification.

S206. Determine whether the application program installation package exists in the application center, and if the application program installation package exists in the application center, perform S208; or if the application program installation package does not exist in the application center, perform S207.

S207. Compile, by the application center, application program source code by adapting the multiple convergence parameter interfaces, and generate the application program installation package.

S208. Download the application program installation package, and install the downloaded application program installation package.

Figure 4:
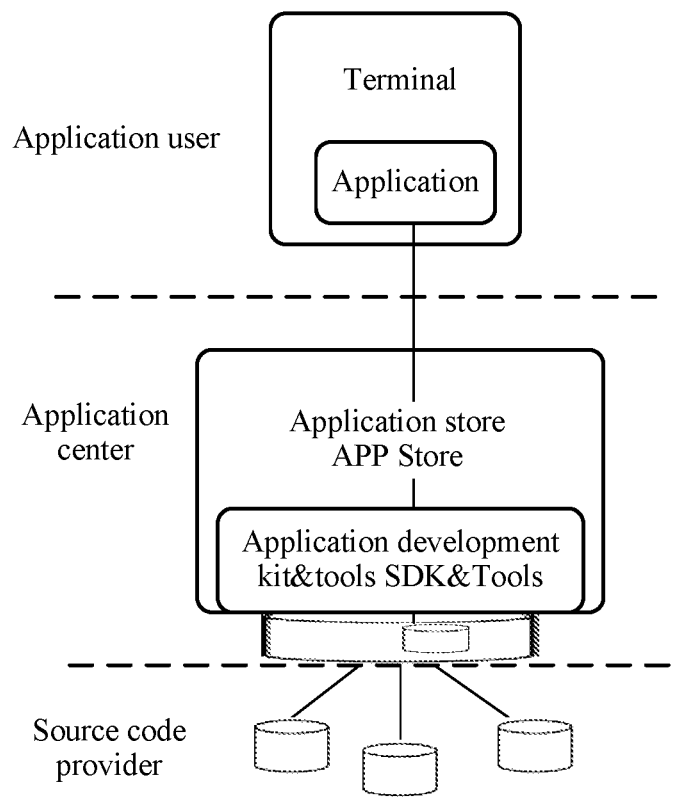
FIG. 4 is a schematic diagram of application interface compatibility adaptation after convergence is implemented in an application center according to an embodiment of the present invention.

In S204 to S208, whether the convergence parameter interfaces meet the convergence specification is checked, and the convergence parameter interfaces are adapted to meet the convergence specification, so that the operating system can call the convergence parameters in the convergence parameter interfaces to perform the application convergence. FIG. 4 is a schematic diagram of application interface compatibility adaptation after convergence is implemented in an application center according to an embodiment of the present invention. In this embodiment, before convergence parameters of multiple applications are obtained for application convergence, it is further required to check whether multiple convergence parameter interfaces meet a convergence specification. If the multiple convergence parameter interfaces do not meet the convergence specification of an operating system, the convergence is stopped, and then an application program installation package that meets the convergence specification is requested from the application center (such as an app store or an app market). If there is no application program installation package meeting the convergence specification in the application market, application program source code is recompiled by adapting corresponding interfaces, and a new application program installation package is generated; and then a notification that there is an application program installation package that meets the specification and a requirement is received, a corresponding application program installation package is obtained, and a downloaded application program installation package is reinstalled; or if the application program installation package exists in the application center, the application program installation package is directly downloaded and installed.

S209. Determine a display user interface of a converged application.

An application attribute includes a social relationship attribute, a time relationship attribute, a transaction scheduling attribute, a communication deterministic attribute, and the like. An interface display parameter of the converged application may be determined according to the application attribute, so as to generate a corresponding display user interface according to the interface display parameter. Specifically, the apparatus may store some interface templates generated by means of convergence according to different application attributes, and select a corresponding interface template according to application attributes of to-be-converged applications.

S210. Separately obtain multiple convergence parameters of the multiple applications by using the multiple convergence parameter interfaces; separately converge the obtained multiple convergence parameters of the multiple applications, so as to obtain a logical relationship between data of the converged application and obtain a format of the data of the converged application; and obtain the data of the converged application according to convergeability limit information of data of each application.

The user may select to converge multiple applications installed on a terminal, and receive the convergence operation request of the user for the selected applications. During application convergence, the multiple convergence parameters of the multiple to-be-converged applications may be obtained by using the multiple convergence parameter interfaces. Specifically, for example, formats of data of the multiple applications are obtained by using the data format registration interface, and a logical relationship between the data of the multiple applications is obtained by using the data logical relationship registration interface.

After the multiple convergence parameters of to-be-converged applications requested in the convergence operation request are obtained, the obtained multiple convergence parameters of the multiple applications are separately converged, so as to obtain the logical relationship between the data of the converged application and obtain the format of the data of the converged application. Specifically, the formats of the data of the multiple applications are obtained by using the data format registration interface, and convergeability of the formats of the data of the multiple applications is checked, so as to obtain a converged data format as the format of the data of the converged application; and the logical relationship between the data of the multiple applications is obtained by using the data logical relationship registration interface, so as to determine the logical relationship between the data of the converged application.

After the format of the data of the converged application and the logical relationship between the data of the converged application are determined, the data of the converged application is obtained according to the convergeability limit information obtained from the convergence parameter interfaces. That is, the data available in each application is obtained.

It should be noted that there is no sequence between S209 and S210.

S211. Output, on the display user interface of the converged application, the data of the converged application according to the format of the data of the converged application and the logical relationship between the data of the converged application.

After the data available in each application is obtained, the obtained data is processed according to the generated format of the data of the converged application and the generated logical relationship between the data of the converged application, and is output on the display user interface of the converged application.

S212. Separately register the logical relationship between the data of the converged application, the format of the data of the converged application, and/or convergeability limit information of the data of the converged application by using the multiple convergence parameter interfaces.

For the converged application, a new data format may be generated, there may be a new logical relationship between data, and there may be a new data generation rule and a new data read rule for the data. Therefore, the format of the data of the converged application, the logical relationship between the data of the converged application, and the data generation rule and the data read rule need to be registered on the multiple convergence parameter interfaces. After the registration, the converged application may be further used as an original application to converge with another application.

According to the application convergence method provided in this embodiment of the present invention, multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications. In addition, interworking between data of the multiple applications is implemented; and application convergence is implemented by performing a drag operation on an operation, and therefore an operation is simple and convenient.

The following describes, by using a specific example, in detail an application convergence method performed based on a convergence operation request of a user for multiple applications.

Application convergence of a first application and a second application is used as an example for description. Herein, an operating system enhances and refines an installation process of an application program. This is reflected in: a format of data, a logical relationship between the data, and convergeability limit information that are registered in a storage area of the operating system; and a data generation rule and a data read rule. Various previous operating systems do not require registration of such information. In the following examples used for description, neither an operation form nor an operation requirement on a graphical interface is considered.

I. An Operating System Enables Application Convergence

The operating system provides a registration interface and a storage space in an installation phase of an application program to receive a request for initializing the application program. That is, the operating system provides multiple convergence parameter interfaces, which are called by the application program during installation, so as to register data and other related information that are of the application program in a storage space of the operating system. These interfaces include:

A. genInitialData( ): an interface for generating initial data in an installation process, that is, for generating metadata (Metadata) about the application program. The metadata is a preview summary table, and includes basic information of convergence parameters of multiple applications. Requirements for column forms of the metadata are as follows:

{appID/An application ID, counTables/A quantity of summary tables of an application, 1stTables/A list of tables of the application, tblFromNetwork/Data from a network server is preferred, tblLocally/Only data stored in a local table is used}.

B. regDataEncoder( ): an interface for registering a data generation rule. An execution body or a program segment of the data generated by using the data in a registered format in a data generation process may be registered by calling this interface in the installation process.

C. regDateDecoder( ): an interface for registering a data read rule. Data content that is stored in a form of a two-dimensional data table and that is read in the registered format in a data extraction/read process may be registered by calling this interface in the installation process.

D. regDataFormat( ): an interface for registering a data format. The format of the data generated by the application may be registered by calling this interface in the installation process. One method is to use a manner of a series of two-dimensional tables (table) in the format of the data. Each table has a table name (table name), and a group of key names (key name) are specified in the table to form a column (column). Correspondingly, for each table and key name herein, there are an array (tuple) including a group of key names and multiple data tables including tuples in a write phase of the initial data (when genInitialData is called) and in an application data generation phase in a normal use process.

E. regDataBusinessLogic( ): an interface for registering service logic reflected in the data. The service logic of the application data may be registered by calling this interface in the installation process, that is, information indicating a "logical relationship" between a data application and a service, such as a relationship between all tables of all two-dimensional data tables, a basic level relationship between the data, and a display level when a service is provided for a user. Requirements for column forms of these service logic tables are as follows:

1. {appID/An application ID, countBaseTables/A quantity of base data tables of the application, 1stBaseTables/A list of the base data tables of the application};

2. {appID/An application ID, countTopTables/A quantity of top-level data tables of the application, 1stTopTables/A list of the top-level data tables of the application}; and 3. {appID/An application ID, countTableLevels/A quantity of data table levels of the application, arrayTableLevels/A data table relationship matrix of the application}.

F. regDataTranferRight( ): an interface for registering convergeability limit information that is used to specify related data. Convergeability of the application data is specified by calling this interface in the installation process. "Convergeability of data" may mean that no data of an entire application supports convergence, or some data supports convergence, or some data does not support convergence, or may refer to another convergeability limit and requirement.

II. Convergence Preparation of Applications in Installation Processes

In comparison with a previous operating system, detailed differences of the first application and the second application that are reflected during the installation processes reflect ultimate support for the convergence.

(I) An Installation Process of the First Application

In this embodiment, for example, the first application is a friend application. The first application calls, in the installation process, corresponding apparatus interfaces to register convergence parameters, and details are as follows:

A: Call a genInitialData interface to generate metadata of an application program:

{12321/An application ID assigned to the first application by an apparatus, 5/The first application of the application program has five data tables in total, {1, 2, 3, 4, 5}/Table names of all tables of the first application of the application program, {1, 2, 3}/Data from a server is preferred, {4, 5}/Only data stored in a local table is used}.

B/C: After separately calling regDataEncoder and regDateDecoder interfaces, an installation program of the first application stores, in a data area I of the apparatus, multiple parsing interfaces and an interface use rule that are of the first application, where two key interfaces of the multiple parsing interfaces are getXXXDataFromTables( ) used to obtain the data from the data table of the first application and setXXXAMPDataIntoTables( ) used to write the data into the data table of the first application. The former is used to obtain the data from the data table, and the latter is used to write some data into the data table as a record for permanent storage.

D: The installation program of the first application calls a regDataFormat interface, so as to generate and store, in a data area II of the operating system, metadata metadata of the application program of the first application:

D.0: A table with record content {1/Table 1 of the first application, 5/The application program uses the five data tables, {{ }, { }, { }, { }, { }}/Addresses used to record formats of the five data tables, {{ }, { }, { }, { }, { }}/Addresses used to record data of the five tables} is used as a basic description of the following tables; and a specific data table definition and format that are generated and stored in the data area II of the operating system are as follows:

D.1: A table {goodfriendid/an ID of a friend, friendname/A name of the friend, friendnickyname/A nickname of the friend} is used to record basic information of a user of the first application;

D.2: A table {goodfriendid/An ID of a friend, relationbegintime/Contact start time, chartcount/An interaction count} is used to record statistics about interaction with friends;

D.3: A table {goodfriendid/An ID of a friend, activetype/An interaction type, activetime/Interaction time, activecountaddr/An address of an interaction content record} is used to record interaction content with friends;

D.4: A table {goodfriendid/An ID of a friend, Settings/A quantity of rights settings for the friend, 1stRights/A rights setting type} is used to record a view rights setting of the user for the "friends"; and D.5: A table {sortInGUI/An interface display sequence, goodfriendid/An ID of a friend} is used to record a setting of the user for a running interface.

E: The installation program of the first application generates and stores, in a data area III of the operating system, a group of records of a "service logic space".

E.1: {12321/An application ID assigned to the first application by the apparatus, 2/The first application of the application program has two base data tables, {1, 2}/Table names of the base data tables of the first application of the application program};

E.2: {12321/An application ID assigned to the first application by the apparatus, 1/The first application of the application program has one top-level data table, {5}/A table name of the top-level data table of the first application of the application program}; and E.3: {12321/An application ID assigned to the first application by the apparatus, 2/A quantity of data levels used by the first application of the application program is 3, {{1, 2, 3}, {4, 5}}/A data table relationship matrix of the first application of the application program}.

F: The installation program of the first application calls a regDataTranferRight interface, so as to generate and store, in a data area IV of the operating system, a record: {12321/An application ID assigned to the first application by the apparatus, 2/The installation program limits convergence transfer for Table 2 of the first application, { }/A list of specific fields that are used to limit the convergence transfer in Table 2}.

(II) An Installation Process of the Second Application

In this embodiment, for example, the second application is a map application. The second application of the application program calls, in the installation process, corresponding apparatus interfaces to register convergence parameters, and details are as follows:

A: An installation program of the second application calls the genInitialData interface, so as to generate and store, in the data area II of the operating system, the metadata of the application program:

{32123/An application ID assigned to the second application by the apparatus, 2/The second application of the application program has two data tables in total, {1, 2, 3}/Table names of all tables of the second application of the application program, {1, 2}/Data from a server is preferred, {3}/Only data stored in a local table is used}.

B/C: After separately calling the regDataEncoder and regDateDecoder interfaces, the installation program of the second application generates and stores, in the data area I of the operating system, multiple parsing interfaces and an interface use rule that are of the second application, where two key interfaces of the multiple parsing interfaces are getAMPDataFromTables( ) and setAMPDataIntoTables( ). The former is used to display a result of a path record of the user, and the latter is used to write the path record of the user into a historical record.

D: The installation program of the second application calls the regDataFormat interface, so as to generate and store, in the data area I of the operating system, metadata metadata of the application program of the second application:

D.0: A data record used to record specific data tables used by the second application {32123/An application ID assigned to the second application by the apparatus, 123456789/A random ID assigned to the user by the apparatus, 3/The application program uses three data tables, {{ }, { }, { }}/Addresses used to record formats of the three data tables, {{ }, { }, { }/Addresses used to record data of the three tables} is used as a basic description of the following tables; and a specific data table definition and format generated and stored in the data area II of the operating system are as follows:

D.1: A table {pointSerial/A serial number of a path point, datetime/time, longitude/longitude, latitude/latitude} is used to record path point information of the user based on time and a place;

D.2: A table {pointSerial/A serial number of a path point, longPOI/A number of an article of interest on the path point} is used to record path point-based "association" of the user for the article of interest; and D.3: A table {pointSerial/A serial number of a path point, typePresent/A map interface display type of the path point} is used to record a place and a manner when the user last uses a map.

E. The installation program of the second application generates and stores, in the data area III of the operating system, a group of records of a "service logic space".

E.1: {32123/An application ID assigned to the second application by the apparatus, 2/The second application of the application program has two base data tables, {1, 2}/Table names of the base data tables of the second application of the application program};

E.2: {32123/An application ID assigned to the second application by the apparatus, 1/The second application of the application program has one top-level data table, {3}/A table name of the top-level data table of the second application of the application program}; and E.3: {32123/An application ID assigned to the second application by the apparatus, 2/A quantity of data levels used by the second application of the application program is 2, {{1, 2}, {3}}/A data table relationship matrix of the second application of the application program}.

F. The installation program of the second application calls the regDataTranferRight interface, so as to generate and store, in the data area IV of the operating system, a record: {32123/An application ID assigned to the second application by the apparatus, NULL/A quantity of application data tables with convergeability limited by the installation program is 0}.

III. Data Convergence and New Application Generation in a Convergence Process A. Trigger convergence of a first application and a second application, and generate a new third application of an application program according to a convergence operation request of a user.

B. Check whether interfaces registered by the first application and the second application meet a convergence specification. If the interfaces registered by the first application and the second application do not meet the convergence specification of the operating system, stop the convergence, and then:

B.1. Request, from an application market (an app store or an app market), an application program installation package that meets the convergence specification.

B.1.1: If there is no application program installation package meeting the convergence specification in the application market, recompile application program source code by adapting corresponding interfaces, and generate a new application program installation package; and B.1.2. Send a notification that there is an application program installation package that meets the specification and a requirement.

B.2. Obtain a corresponding application program installation package.

B.3. Convert data of the application program from a previous format (which does not meet the convergence specification) to a new format (which meets the convergence specification), so as to complete update of an execution condition of the application program.

C. Obtain convergence parameters and application data tables that are of the first application and the second application and that are registered in all data areas I/II/III/IV/V of an operating system.

D. Check convergeability of data formats of the first application and the second application, so as to obtain a converged data format as a data format of the converged application, where the converged application is the third application.

E. Check conflict between IDs of a user (An actual situation is as follows: An ID presented to the user by the first application of the application program is a specific value, and the second application does not present a specific ID to the user, and therefore, there is no explicit conflict between the IDs).

F. Instruct the user to confirm that the ID of the first application of the application program is used in the new third application of application program to replace a random ID of the second application of the application program.

G. "Friend information" of the first application of the application program is limited to be non-transferable after convergence, that is, convergeability limit information of the first application includes:

G.1. A newly converged application cannot obtain any information about an original "friend" and any content about interaction between an original ID and a "friend"; and G.2. The newly converged application may use a data interface that is inherited from the first application of the application program (including allowing for use of a digital certificate of an original application) to read a "friend" relationship; or G.3. The newly converged application may use a data interface that is inherited from the first application of the application program (including allowing for use of a digital certificate of an original application) to modify a "friend" relationship; or G.4. The newly converged application may use a data interface that is inherited from the first application of the application program (including allowing for use of a digital certificate of an original application) to add a "friend" relationship.

H. Determine convergence data of the third application according to the converged data format and obtained convergeability limit information of application data content of the first application and the second application.

I. An apparatus provides a basic data element option for a "friend map" of a new application program, and provides a top-level data element option for the "friend map" of the application program, which are determined by the user by means of selection.

J. The apparatus provides service logic and a presentation content option and suggestion that are reflected in a data table relationship and that are of the "friend map" of the new application program.

K. After performing an analysis, the apparatus determines an interface display parameter according to a social relationship attribute of the first application of the application program and a time relationship attribute of the second application (another type of the application program includes a transaction scheduling attribute, for example, a meeting/schedule, a communication deterministic attribute, for example, an email, and the like).

Therefore, the user selects and confirms a new application with a map as a base interface, and historical and even current position information of the user (which vary according to limiting conditions in G2 to G5 and inheritance content selected by the user) and the friends as presentation content and a presentation result, for example, the second application is a map application program.

L. Register the data format of the third application by using a regDataFormat( ) interface.

M. Register a service logic relationship of the third application by using a regDataBusinessLogic( ) interface.

N. Obtain a data generation rule of the third application according to data generation rules of the first application and the second application, and register the data generation rule of the third application by using a regDataEncoder( ) interface; and obtain a data read rule of the third application according to data read rules of the first application and the second application, and register the data read rule of the third application by using a regDateDecoder( ) interface.

O. Generate metadata of the application program for the third application.

P. Store the foregoing registered content into each corresponding data area.

Q. Copy data from a data space of a native application program to a data space of the new application program according to a data transfer relationship between the native application program and the new application program.

R. Confirm that data validation is correct, and notify the user that convergence into the new application succeeds.

S. Based on maximized transfer permission and data convergence, the third application allows the user to display interaction on a map interface, including time, a place, an object, a manner, and content, for example, the second application is the map application program; or T. In a possible case (with support of an operation convergence use feature, a new version of the first application of the application program, and a new version of the second application), the third application may further aggregate interaction with all friends based on a geographical area, or aggregate interaction with all friends based on a time range, or display interaction with friends based on a geographical location, or display interaction with friends based on a timeline relationship.

It should be noted that, for ease of description, the foregoing method embodiments are expressed as a series of action combinations. However, a person skilled in the art should appreciate that the present invention is not limited to the described sequence of the actions, because some steps may be performed in another sequence or performed at the same time according to the present invention. In addition, a person skilled in the art should also appreciate that all the embodiments described in the specification are preferred embodiments, and the related actions and modules are not necessarily mandatory to the present invention.

Figure 5:
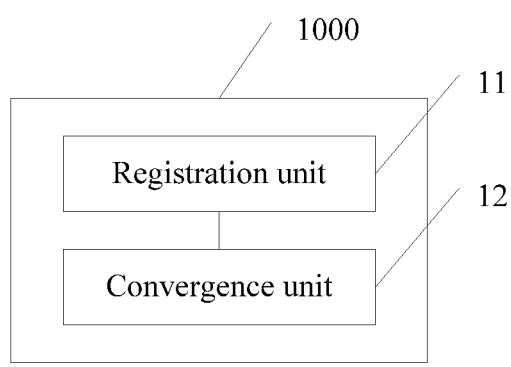
FIG. 5 is a schematic structural diagram of an application convergence apparatus according to an embodiment of the present invention.

FIG. 5 is a schematic structural diagram of an application convergence apparatus according to an embodiment of the present invention. The apparatus 1000 includes a registration unit 11 and a convergence unit 12.

The registration unit 11 is configured to: when multiple applications are installed, register multiple convergence parameters of each application by using multiple convergence parameter interfaces.

In this embodiment, an operating system enhances and refines an installation process of an application program, and provides the multiple convergence parameter interfaces, which are called by the application program during installation, so as to receive a request for registering the multiple convergence parameters of each application.

The multiple convergence parameters herein include a format of data of each application and a logical relationship between the data of each application. The application may register the format of the data of each application by using a data format registration interface, and may register the logical relationship between the data of each application by using a data logical relationship registration interface. Certainly, the application may also register the foregoing multiple convergence parameters by using a same interface. For the format of the data of each application, multiple two-dimensional tables are used to describe the data of each application; and the logical relationship between the data of each application includes a relationship between the multiple two-dimensional tables, and a base data table and a top-level data table that are in the multiple two-dimensional tables.

The convergence parameters may further include a data generation rule and a data read rule. The data generation rule indicates that an execution body or a program segment of the data is generated by using the data in a registered format in a data generation process. The data read rule indicates that data content stored in a form of a two-dimensional data table is read in the registered format in a data extraction/read process.

The convergence unit 12 is configured to: when a convergence operation request of a user for the multiple applications is received, determine a display user interface of a converged application, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

The user may select to converge multiple applications installed on a terminal, and receive the convergence operation request of the user for the selected applications. During application convergence, the multiple convergence parameters of the multiple to-be-converged applications may be obtained by using the multiple convergence parameter interfaces. Specifically, for example, formats of data of the multiple applications are obtained by using the data format registration interface, and a logical relationship between the data of the multiple applications is obtained by using the data logical relationship registration interface.

After the multiple convergence parameters of to-be-converged applications requested in the convergence operation request are obtained, the obtained multiple convergence parameters of the multiple applications are separately converged, so as to obtain the logical relationship between the data of the converged application and obtain the format of the data of the converged application. Specifically, the formats of the data of the multiple applications are obtained by using the data format registration interface, and convergeability of the formats of the data of the multiple applications is checked, so as to obtain a converged data format as the format of the data of the converged application; and the logical relationship between the data of the multiple applications is obtained by using the data logical relationship registration interface, so as to determine the logical relationship between the data of the converged application.

It should be noted that application installation may not be performed in the operating system, and an application icon is not displayed on a user interface, but application convergence may be completed, provided that the multiple convergence parameters are registered by using the convergence parameter interfaces; certainly, application installation may be performed in the operating system, an application icon is displayed on a user interface, and during the application installation, the multiple convergence parameters are registered by using the convergence parameter interfaces, and the convergence operation request of the user for the applications is received, so as to perform an application convergence operation.

According to the application convergence apparatus provided in this embodiment of the present invention, multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications.

Figure 6:
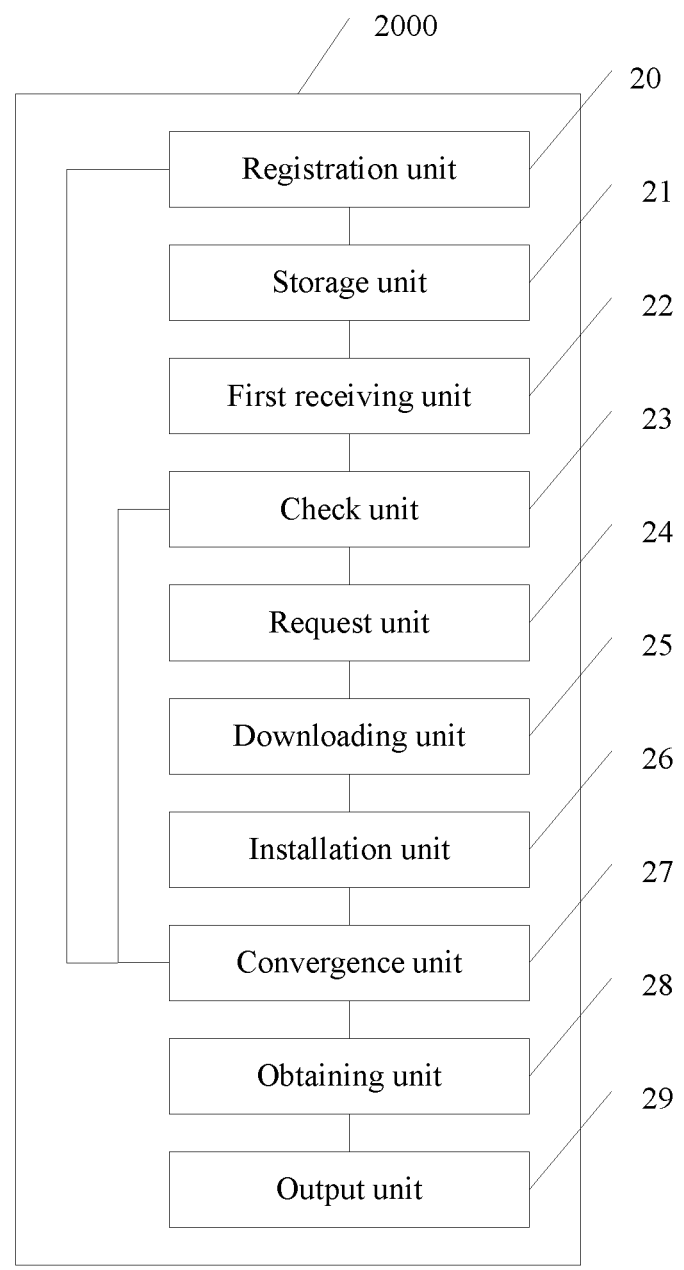
FIG. 6 is a schematic structural diagram of another application convergence apparatus according to an embodiment of the present invention.

FIG. 6 is a schematic structural diagram of another application convergence apparatus according to an embodiment of the present invention. The apparatus 2000 includes a registration unit 20, a storage unit 21, a first receiving unit 22, a check unit 23, a request unit 24, a downloading unit 25, an installation unit 26, a convergence unit 27, an obtaining unit 28, and an output unit 29.

The registration unit 20 is configured to: when multiple applications are installed, register multiple convergence parameters of each application by using multiple convergence parameter interfaces.

In this embodiment, an operating system enhances and refines an installation process of an application program, and provides the multiple convergence parameter interfaces, which are called by the application program during installation, so as to receive a request for registering the multiple convergence parameters of each application.

The multiple convergence parameters herein include a format of data of each application, a logical relationship between the data of each application, and convergeability limit information of the data of each application. The application may register the format of the data of each application by using a data format registration interface, may register the logical relationship between the data of each application by using a data logical relationship registration interface, and may register the convergeability limit information of the data of each application by using a convergeability limit registration interface. Certainly, the application may also register the foregoing multiple convergence parameters by using a same interface. For the format of the data of each application, multiple two-dimensional tables are used to describe the data of each application; the logical relationship between the data of each application includes a relationship between the multiple two-dimensional tables, and a base data table and a top-level data table that are in the multiple two-dimensional tables; and the convergeability limit information of the data of each application includes information about data that supports convergence and/or does not support convergence and that is in the data of each application.

The convergence parameters may further include a data generation rule and a data read rule. The data generation rule indicates that an execution body or a program segment of the data is generated by using the data in a registered format in a data generation process. The data read rule indicates that data content stored in a form of a two-dimensional data table is read in the registered format in a data extraction/read process.

The storage unit 21 is configured to separately store the multiple convergence parameters of each application into a storage space of the operating system.

The multiple convergence parameters received by using all the convergence parameter interfaces are separately stored into multiple storage spaces of the operating system, so that the operating system calls the multiple convergence parameters during application convergence.

The first receiving unit 22 is configured to receive an operation request of the user for creating a new application by dragging the multiple applications to an empty position.

The converged application is the newly created application. The user may select to converge multiple applications installed on a terminal, and the apparatus receives a convergence operation request of the user for the selected applications. A drag may be directly performed on an application icon to trigger convergence. The drag includes dragging multiple applications to the empty position. A new application is created in the empty position, and the converged application is the newly created application.

In an alternative implementation, the first receiving unit 22 may be further configured to receive an operation request of the user for dragging the multiple applications to a target application, where the converged application is the target application, and the target application is one of the multiple applications.

The foregoing drag manner is provided based on a terminal desktop, for example, a graphical user interface, so that the user can directly drag an application icon on the desktop. The application convergence is implemented by performing a drag operation on an operation, and therefore an operation is simple and convenient.

In another alternative implementation, the application convergence apparatus may further include a second receiving unit. The second receiving unit is configured to receive a request of the user for selecting the multiple applications and the converged application in an application list, where the converged application is one of the multiple applications or an application other than the multiple applications in the application list. That is, the applications are selected in the application list for convergence. Only identifiers of the multiple applications are listed in the application list for selection. The user may select the converged application as the application of the multiple applications or the application other than the multiple to-be-converged applications in the application list.

The convergence is implemented by selecting an application in the application list, and therefore an operation is simple and convenient.

The check unit 23 is configured to check whether the multiple convergence parameter interfaces meet a convergence specification.

The request unit 24 is configured to request, from an application center, an application program installation package including multiple convergence parameter interfaces that meet the convergence specification.

The downloading unit 25 is configured to: if the application program installation package exists in the application center, download the application program installation package; or the downloading unit 25 is configured to: if the application program installation package does not exist in the application center, compile, in the application center, application program source code by adapting the multiple convergence parameter interfaces, and after the application program installation package is generated, download the application program installation package.

The installation unit 26 is configured to install the downloaded application program installation package.

In the foregoing descriptions, whether the convergence parameter interfaces meet the convergence specification is checked, and the convergence parameter interfaces are adapted to meet the convergence specification, so that the operating system can call the convergence parameters in the convergence parameter interfaces to perform the application convergence. FIG. 4 is a schematic diagram of application interface compatibility adaptation after convergence is implemented in an application center according to an embodiment of the present invention. In this embodiment, before convergence parameters of multiple applications are obtained for application convergence, it is further required to check whether multiple convergence parameter interfaces meet a convergence specification. If the multiple convergence parameter interfaces do not meet the convergence specification of an operating system, the convergence is stopped, and then an application program installation package that meets the convergence specification is requested from the application center (such as an app store or an app market). If there is no application program installation package meeting the convergence specification in the application market, application program source code is recompiled by adapting corresponding interfaces, and a new application program installation package is generated; and then a notification that there is an application program installation package that meets the specification and a requirement is received, a corresponding application program installation package is obtained, and a downloaded application program installation package is reinstalled; or if the application program installation package exists in the application center, the application program installation package is directly downloaded and installed.

The convergence unit 27 is configured to: when a convergence operation request of a user for the multiple applications is received, determine a display user interface of a converged application, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

An application attribute includes a social relationship attribute, a time relationship attribute, a transaction scheduling attribute, a communication deterministic attribute, and the like. An interface display parameter of the converged application may be determined according to the application attribute, so as to generate a corresponding display user interface according to the interface display parameter. Specifically, the apparatus may store some interface templates generated by means of convergence according to different application attributes, and select a corresponding interface template according to application attributes of to-be-converged applications.

The user may select to converge multiple applications installed on a terminal, and receive the convergence operation request of the user for the selected applications. During application convergence, the multiple convergence parameters of the multiple to-be-converged applications may be obtained by using the multiple convergence parameter interfaces. Specifically, for example, formats of data of the multiple applications are obtained by using the data format registration interface, and a logical relationship between the data of the multiple applications is obtained by using the data logical relationship registration interface.

After the multiple convergence parameters of to-be-converged applications requested in the convergence operation request are obtained, the obtained multiple convergence parameters of the multiple applications are separately converged, so as to obtain the logical relationship between the data of the converged application and obtain the format of the data of the converged application. Specifically, the formats of the data of the multiple applications are obtained by using the data format registration interface, and convergeability of the formats of the data of the multiple applications is checked, so as to obtain a converged data format as the format of the data of the converged application; and the logical relationship between the data of the multiple applications is obtained by using the data logical relationship registration interface, so as to determine the logical relationship between the data of the converged application.

The obtaining unit 28 is configured to obtain the data of the converged application according to the convergeability limit information of the data of each application.

After the format of the data of the converged application and the logical relationship between the data of the converged application are determined, the data of the converged application is obtained according to the convergeability limit information obtained from the convergence parameter interfaces. That is, the data available in each application is obtained.

The output unit 29 is configured to output, on the display user interface of the converged application, the data of the converged application according to the format of the data of the converged application and the logical relationship between the data of the converged application.

After the data available in each application is obtained, the obtained data is processed according to the generated format of the data of the converged application and the generated logical relationship between the data of the converged application, and is output on the display user interface of the converged application.

The registration unit 20 is further configured to separately register the logical relationship between the data of the converged application, the format of the data of the converged application, and/or convergeability limit information of the data of the converged application by using the multiple convergence parameter interfaces.

For the converged application, a new data format may be generated, there may be a new logical relationship between data, and there may be a new data generation rule and a new data read rule for the data. Therefore, the format of the data of the converged application, the logical relationship between the data of the converged application, and the data generation rule and the data read rule need to be registered on the multiple convergence parameter interfaces. After the registration, the converged application may be further used as an original application to converge with another application.

According to the application convergence apparatus provided in this embodiment of the present invention, multiple convergence parameter interfaces are provided, and multiple convergence parameters registered by an application by using the convergence parameter interfaces are received. Therefore, when a convergence operation request of a user or an apparatus for multiple applications is received, multiple convergence parameters of the multiple applications can be obtained from the multiple convergence parameter interfaces; and the multiple convergence parameters of the multiple applications are separately converged, so as to implement convergence of the multiple applications. In addition, interworking between data of the multiple applications is implemented; and application convergence is implemented by performing a drag operation on an operation, and therefore an operation is simple and convenient.

Figure 7:
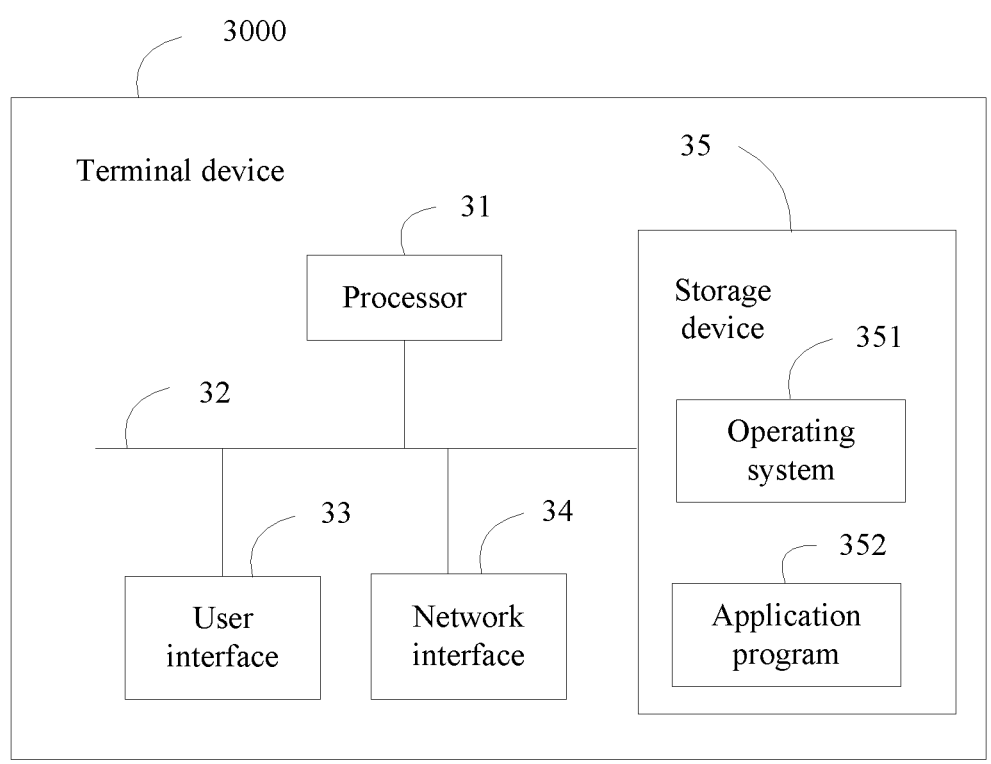
FIG. 7 is a schematic structural diagram of another terminal device according to an embodiment of the present invention.

FIG. 7 describes a structure of another terminal device 3000 according to an embodiment of the present invention. The terminal device 3000 includes at least one processor 31, at least one network interface 34 or another user interface 33, a storage device 35, and at least one communications bus 32. The communications bus 32 is configured to implement connection and communication between these components. Optionally, the terminal device 30 includes the user interface 33. The user interface 33 includes a display (such as a touchscreen, an LCD, a CRT, holographic imaging (Holographic), or a projector (Projector)), a keyboard, or a pointer device (such as a mouse, a trackball (trackball), a touchpad, or a touchscreen).

The storage device 35 may include a read-only memory and a random access memory, and provides an instruction and data for the processor 31. A part of the storage device 35 may further include a nonvolatile random access memory (NVRAM).

In some implementations, the storage device 35 stores the following elements: an executable module or a data structure, or a subset thereof, or an extended set thereof:

an operating system 351, including various apparatus programs and multiple convergence parameter interfaces in this embodiment, such as a framework layer, a kernel library layer, and a driver layer that are shown in FIG. 1, and configured to implement various basic services and process a hardware-based task; and an application program module 352, including various application programs, such as a graphical user interface, an application list, and a browser (Browser) that are shown in FIG. 1, and configured to implement various application services.

In this embodiment of the present invention, by calling a program or the instruction stored in the storage device 35, the processor 31 is configured to: when multiple applications are installed, register multiple convergence parameters of each application by using multiple convergence parameter interfaces, where the multiple convergence parameters include a format of data of each application and a logical relationship between the data of each application; and when a convergence operation request of a user for the multiple applications is received, determine a display user interface of a converged application, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

Optionally, in an embodiment, the multiple convergence parameters further include convergeability limit information of the data of each application; and the processor 31 is further configured to: obtain the data of the converged application according to the convergeability limit information of the data of each application; and output, on the display user interface of the converged application, the data of the converged application according to the logical relationship between the data of the converged application and according to the format of the data of the converged application.

Further, for the format of the data of each application, multiple two-dimensional tables are used to describe the data of each application; the logical relationship between the data of each application includes a relationship between the multiple two-dimensional tables, and a base data table and a top-level data table that are in the multiple two-dimensional tables; and the convergeability limit information of the data of each application includes information about data that supports convergence and/or does not support convergence and that is in the data of each application.

Further, the processor 31 is further configured to separately store the multiple convergence parameters of each application into a storage space of an operating system.

Further, the processor 31 is further configured to: receive an operation request of the user for dragging the multiple applications to a target application, where the converged application is the target application, and the target application is one of the multiple applications; or receive an operation request of the user for creating a new application by dragging the multiple applications to an empty position, where the converged application is the newly created application.

Further, the processor 31 is further configured to receive a request of the user for selecting the multiple applications and the converged application in an application list, where the converged application is one of the multiple applications or an application other than the multiple applications in the application list.

Further, the processor 31 is further configured to: check whether the multiple convergence parameter interfaces meet a convergence specification;

if a check result does not meet the convergence specification, request, from an application center, an application program installation package including multiple convergence parameter interfaces that meet the convergence specification;

if the application program installation package exists in the application center, download the application program installation package; or if the application program installation package does not exist in the application center, compile, in the application center, application program source code by adapting the multiple convergence parameter interfaces, and after the application program installation package is generated, download the application program installation package; and install the downloaded application program installation package.

Further, the processor 31 is further configured to separately register the logical relationship between the data of the converged application, the format of the data of the converged application, and/or convergeability limit information of the data of the converged application by using the multiple convergence parameter interfaces.

In addition, the terminal device 30 may perform the methods and the embodiments in FIG. 2 and FIG. 3A-FIG. 3B, and details are not described in this embodiment of the present invention again.

It can be learned that after the foregoing solution is used, when a convergence operation request of a user or an apparatus for multiple applications is received, multiple convergence parameters of the multiple applications are obtained from multiple convergence parameter interfaces; and the multiple convergence parameters of the multiple applications are separately converged, so as to implement convergence of multiple applications.

An embodiment of the present invention relates to still another terminal device 4000 and an application convergence method, and the terminal device 4000 may be a mobile phone, a tablet, a PDA (Personal Digital Assistant, personal digital assistant), a POS (Point of Sales, point of sale), a vehicle-mounted computer, or the like.

Figure 8:
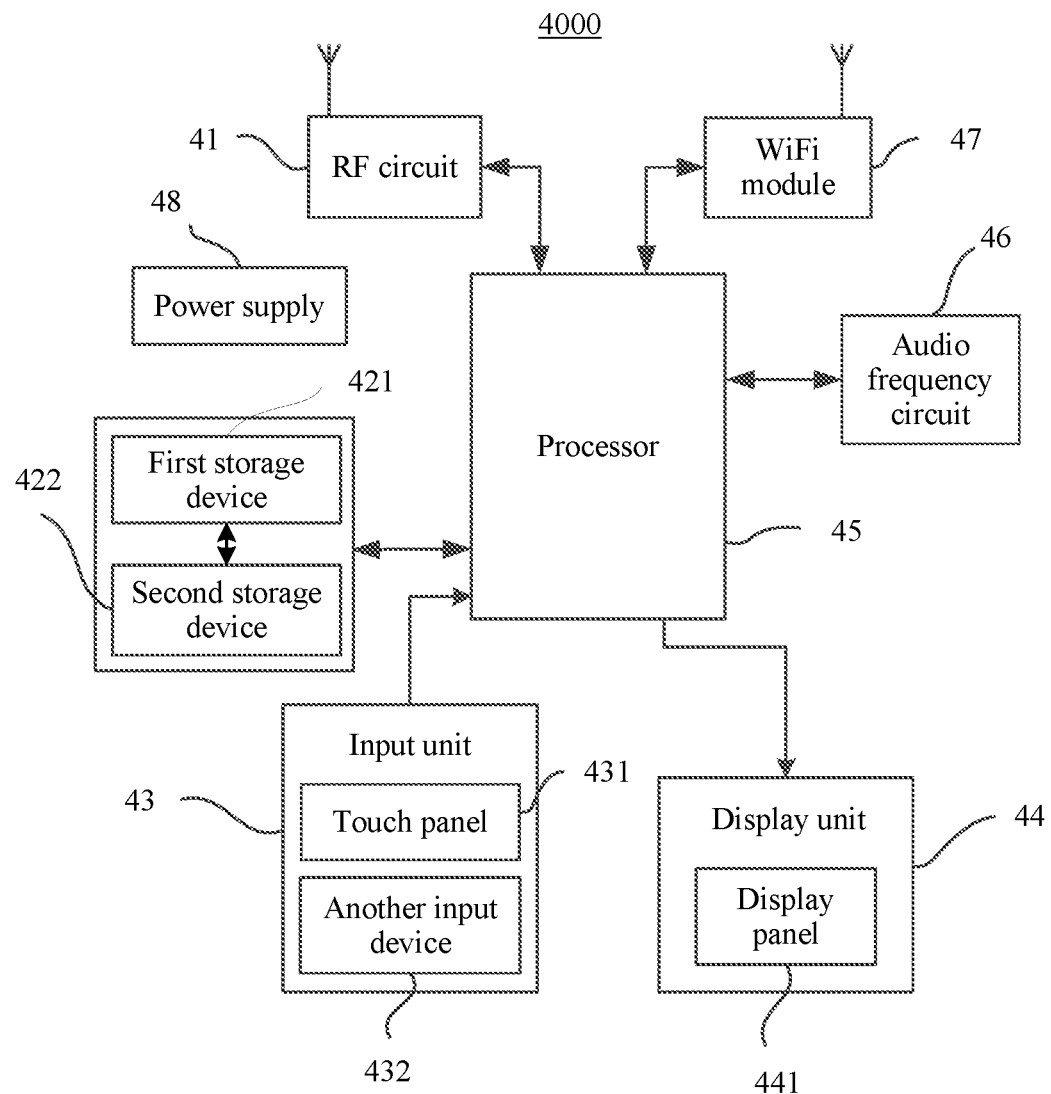
FIG. 8 is a schematic structural diagram of still another terminal device according to an embodiment of the present invention.

FIG. 8 shows a schematic structural diagram of the terminal device 4000 according to this embodiment of the present invention.

Referring to FIG. 8, the still another terminal device 4000 in this embodiment of the present invention includes a first storage device 421, a processor 45, and an input unit 43. The first storage device 421 stores multiple convergence parameters of multiple applications of the terminal. The input unit 43 is configured to receive a convergence operation request of a user for the multiple applications. The processor 45 is configured to: when the multiple applications are installed, register the multiple convergence parameters of each application by using multiple convergence parameter interfaces, and store the multiple convergence parameters in the first storage device 421; and when the convergence operation request that is of the user for the multiple applications and that is input by the input unit 43 is received, determine a display user interface of a converged application, separately obtain multiple convergence parameters of the multiple applications by using the multiple convergence parameter interfaces, and separately converge the obtained multiple convergence parameters of the multiple applications, so as to obtain a logical relationship between data of the converged application and obtain a format of the data of the converged application.

In this embodiment of the present invention, the first storage device 421 may further store convergeability limit information of data of each application, and the terminal device 4000 may further include a second storage device 422, where the second storage device 422 may be configured to store data of all applications of the terminal device 4000. The processor 45 may further obtain the data of the converged application from the second storage device 422 according to the convergeability limit information of the data of each application; and output, on the display user interface of the converged application, the data of the converged application according to the logical relationship between the data of the converged application and according to the format of the data of the converged application.

It may be understood that the second storage device 422 may be an external storage of the terminal device 4000, and the first storage device 421 may be a memory of the terminal device 4000. The processor 45 may load data of the multiple applications from the second storage device 422 into the first storage device 421. Each convergence parameter is corresponding to a storage space in the first storage device 421. Optionally, all the storage spaces may be the same. The first storage device 421 may be one of an NVRAM nonvolatile random access memory, a DRAM dynamic random access memory, an SRAM static random access memory, a Flash flash memory, or the like; and the second storage device 422 may be a hard disk, an optical disc, a USB flash drive, a floppy disk, a tape drive, or the like.

In this embodiment of the present invention, the data of all applications of the terminal may be stored in a cloud server, and the cloud server may be the second storage device 422. The processor 45 obtains the data of the converged application, and stores the data of the converged application into the first storage device 421. Specifically, the processor 45 obtains the data of the converged application in the cloud server by using a network channel, and loads the data of the converged application into the first storage device 421.

The input unit 43 may be configured to receive a digit or character information that is input, and generate signal input related to a user setting and function control that are of the terminal device 4000. Specifically, in this embodiment of the present invention, the input unit 43 may include a touch panel 431. The touch panel 431, also referred to as a touchscreen, may collect a touch operation (such as an operation performed by the user on or near the touch panel 431 by using any appropriate object or accessory, such as a finger or a stylus) of the user on or near the touch panel 431, and drive a corresponding connection apparatus according to a preset program. Optionally, the touch panel 431 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into contact coordinates, and then sends the contact coordinates to the processor 45, and can receive and execute a command sent by the processor 45. In addition, the touch panel 431 may be implemented in multiple types, such as a resistive type, a capacitive type, infrared, and a surface acoustic wave. In addition to the touch panel 431, the input unit 43 may further include another input device 432, and the another input device 432 may include but is not limited to one or more of a physical keyboard, a function key (such as a volume control key or an on/off key), a trackball, a mouse, a joystick, or the like.

The terminal device 4000 may further include a display unit 44, and the display unit 44 may be configured to output the data of the converged application. The display unit 44 may include a display panel 441. Optionally, the display panel 441 may be configured in a form of an LCD (liquid crystal display), an OLED (organic light-emitting diode), or the like.

In this embodiment of the present invention, the touch panel 431 covers the display panel 441, so as to form a touch display. When detecting the touch operation on or near the touch display, the touch display sends the touch operation to the processor 45 to determine a type of a touch event, and then the processor 45 provides corresponding visual output on the touch display according to the type of the touch event.

In this embodiment of the present invention, the touch display includes an application programming interface display area and a common control display area. An arrangement manner of the application programming interface display area and the common control display area is not limited, and may be an arrangement manner such as up and down or side by side that may be used to distinguish between the two display areas. The application programming interface display area may be configured to display an interface of an application program. Each interface may include an interface element such as an icon of at least one application program icon and/or a widget desktop control. The application programming interface display area may be an empty interface that does not include any content. The common control display area is configured to display a control that is relatively frequently used, for example, an application program icon, such as a setting button, an interface number, a scroll box, or a phone book icon.

The processor 45 is a control center of the terminal device 4000, and is connected to each part of an entire mobile phone by using various interfaces and lines, and executes various functions of the terminal device 4000 and processes data by running or executing a software program and/or a module stored in the first storage device 421 and calling data stored in the second storage device 422, so as to perform overall monitoring on the terminal device 4000. Optionally, the processor 45 may include one or more processing units.

In the foregoing embodiments, the description of each embodiment has respective focuses. For a part that is not described in detail in an embodiment, refer to related descriptions in other embodiments.

With descriptions of the foregoing embodiments, a person skilled in the art may clearly understand that the present invention may be implemented by hardware, firmware or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM), another optical disc storage, a disk storage medium, another magnetic storage device, or any other medium that can be configured to carry or store expected program code in a form of an instruction or a data structure and that can be accessed by a computer. In addition, any connection may be appropriately defined as a computer readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer readable medium.

In summary, what is described above is merely example embodiments of the technical solutions of the present invention, but is not intended to limit the protection scope of the present invention. Any modification, equivalent replacement, or improvement made without departing from the principle of the present invention shall fall within the protection scope of the present invention.

The invention claimed is:

1. An application convergence method, comprising:
   when a plurality of applications are installed, registering a plurality of convergence parameters of each of the applications using a plurality of convergence parameter interfaces, wherein the convergence parameters comprise a format of data of each application and a logical relationship between the data of each application;
   when a convergence operation request of a user for the applications is received,
      determining a display user interface of a converged application,
      separately obtaining a plurality of convergence parameters of the applications using the convergence parameter interfaces, and
      separately converging the obtained convergence parameters of the applications to obtain a logical relationship between data of the converged application and obtain a format of the data of the converged application;
   checking whether the convergence parameter interfaces meet a convergence specification;
   if a check result does not meet the convergence specification, requesting, from an application center, an application program installation package comprising a plurality of convergence parameter interfaces that meet the convergence specification; and
   installing the application program installation package.

2. The method according to claim 1, wherein the convergence parameters further comprise convergeability limit information of the data of each application; and wherein the method further comprises:
   obtaining the data of the converged application according to the convergeability limit information of the data of each application; and
   outputting, on the display user interface of the converged application, the data of the converged application according to the logical relationship between the data of the converged application and according to the format of the data of the converged application.

3. The method according to claim 2, wherein for the format of the data of each application, a plurality of two-dimensional tables are used to describe the data of each application; wherein the logical relationship between the data of each application comprises a relationship between the two-dimensional tables, and a base data table and a top-level data table that are in the two-dimensional tables; and wherein the convergeability limit information of the data of each application comprises information about data that supports convergence and/or does not support convergence and that is in the data of each application.

4. The method according to claim 1, further comprising:
   separately storing the multiple convergence parameters of each application into a storage space of an operating system.

5. The method according to claim 1, wherein the receiving a convergence operation request of a user for the applications comprises:
   receiving an operation request of the user for dragging the applications to a target application, wherein the converged application is the target application, and the target application is one of the plurality of applications; or
   receiving an operation request of the user for creating a new application by dragging the applications to an empty position, wherein the converged application is the newly created application.

6. The method according to claim 1, wherein the receiving a convergence operation request of a user for the applications comprises:
   receiving a request of the user for selecting the applications and the converged application in an application list, wherein the converged application is one of the plurality of applications or an application other than the plurality of applications in the application list.

7. The method according to claim 1, wherein before separately obtaining the convergence parameters of the applications using the convergence parameter registration interfaces, the method further comprises:
   checking whether the convergence parameter interfaces meet a convergence specification;
   if the application program installation package exists in the application center, downloading the application program installation package, wherein if the application program installation package does not exist in the application center, the application center is configured to compile application program source code by adapting the convergence parameter interfaces, and wherein after the application program installation package is generated, the application program installation package is downloaded; and
   installing the downloaded application program installation package.

8. An application convergence apparatus, comprising:
   one or more processor units;
   a registration unit executable by the one or more processing units and configured to, when a plurality of applications are installed, register a plurality of convergence parameters of each of the applications using multiple convergence parameter interfaces, wherein the convergence parameters comprise a format of data of each application and a logical relationship between the data of each application;
   a convergence unit executable by the one or more processing units and configured to, when a convergence operation request of a user for the applications is received,
      determine a display user interface of a converged application,
      separately obtain a plurality of convergence parameters of the applications using the convergence parameter interfaces, and
      separately converge the obtained convergence parameters of the applications to obtain a logical relationship between data of the converged application and obtain a format of the data of the converged application;
a check unit configured to check whether the convergence parameter interfaces meet a convergence specification;
a request unit configured to, if a check result does not meet the convergence specification, request, from an application center, an application program installation package comprising multiple convergence parameter interfaces that meet the convergence specification; and
an installation unit configured to install the application program installation package.

9. The apparatus according to claim 8, wherein the convergence parameters further comprise convergeability limit information of the data of each application; and wherein the apparatus further comprises:
an obtaining unit configured to obtain the data of the converged application according to the convergeability limit information of the data of each application; and
an output unit configured to output, on the display user interface of the converged application, the data of the converged application according to the logical relationship between the data of the converged application and according to the format of the data of the converged application.

10. The apparatus according to claim 9, wherein for the format of the data of each application, a plurality of two-dimensional tables are used to describe the data of each application; wherein the logical relationship between the data of each application comprises a relationship between the two-dimensional tables, and a base data table and a top-level data table that are in the multiple two-dimensional tables; and wherein the convergeability limit information of the data of each application comprises information about data that supports convergence and/or does not support convergence and that is in the data of each application.

11. The apparatus according to claim 8, further comprising:
a storage unit configured to separately store the multiple convergence parameters of each application into a storage space of an operating system.

12. The apparatus according to claim 8, further comprising a first receiving unit; and wherein
the first receiving unit is configured to receive an operation request of the user for dragging the plurality of applications to a target application, wherein the converged application is the target application, and the target application is one of the applications; or
the first receiving unit is configured to receive an operation request of the user for creating a new application by dragging the applications to an empty position, wherein the converged application is the newly created application.

13. The apparatus according to claim 8, further comprising a second receiving unit; and wherein
the second receiving unit is configured to receive a request of the user for selecting the applications and the converged application in an application list, wherein the converged application is one of the applications or an application other than the applications in the application list.

14. The apparatus according to claim 8, further comprising:
a check unit configured to check whether the convergence parameter interfaces meet a convergence specification;
a downloading unit configured to, if the application program installation package exists in the application center, download the application program installation package, wherein
if the application program installation package does not exist in the application center, the application center is configured to compile application program source code by adapting the multiple convergence parameter interfaces, and wherein after the application program installation package is generated, the application program installation package is downloaded; and
an installation unit configured to install the downloaded application program installation package.

15. A non-transitory computer-readable medium having instructions stored therein, which when executed by a processor, cause the processor to perform application convergence method, the method comprising:
when a plurality of applications are installed, registering a plurality of convergence parameters of each of the applications using a plurality of convergence parameter interfaces, wherein the convergence parameters comprise a format of data of each application and a logical relationship between the data of each application;
when a convergence operation request of a user for the applications is received,
determining a display user interface of a converged application,
separately obtaining a plurality of convergence parameters of the applications using the convergence parameter interfaces, and
separately converging the obtained convergence parameters of the applications to obtain a logical relationship between data of the converged application and obtain a format of the data of the converged application;
checking whether the convergence parameter interfaces meet a convergence specification;
if a check result does not meet the convergence specification, requesting, from an application center, an application program installation package comprising a plurality of convergence parameter interfaces that meet the convergence specification; and
installing the application program installation package.

16. The computer-readable medium according to claim 15, wherein the convergence parameters further comprise convergeability limit information of the data of each application; and wherein the method further comprises:
obtaining the data of the converged application according to the convergeability limit information of the data of each application; and
outputting, on the display user interface of the converged application, the data of the converged application according to the logical relationship between the data of the converged application and according to the format of the data of the converged application.

17. The computer-readable medium according to claim 16, wherein for the format of the data of each application, a plurality of two-dimensional tables are used to describe the data of each application; wherein the logical relationship between the data of each application comprises a relationship between the two-dimensional tables, and a base data table and a top-level data table that are in the two-dimensional tables; and wherein the convergeability limit information of the data of each application comprises information about data that supports convergence and/or does not support convergence and that is in the data of each application.

18. The computer-readable medium according to claim 15, wherein the method further comprises:

provide separately storing the multiple convergence parameters of each application into a storage space of an operating system.

19. The computer-readable medium according to claim 15, wherein the receiving a convergence operation request of a user for the applications comprises:

receiving an operation request of the user for dragging the applications to a target application, wherein the converged application is the target application, and the target application is one of the plurality of applications; or receiving an operation request of the user for creating a new application by dragging the applications to an empty position, wherein the converged application is the newly created application.

20. The computer-readable medium according to claim 15, wherein the receiving a convergence operation request of a user for the applications comprises:

receiving a request of the user for selecting the applications and the converged application in an application list, wherein the converged application is one of the plurality of applications or an application other than the plurality of applications in the application list.

* * * * *